US011699252B2

(12) United States Patent
Phogat et al.

(10) Patent No.: US 11,699,252 B2
(45) Date of Patent: Jul. 11, 2023

(54) RECONSTRUCTING FREEFORM GRADIENTS FROM AN INPUT IMAGE

(71) Applicant: Adobe Inc., San Jose, CA (US)

(72) Inventors: Ankit Phogat, Noida (IN); Matthew David Fisher, San Carlos, CA (US); Vineet Batra, Delhi (IN); Mrinalini Sardar, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/516,964

(22) Filed: Nov. 2, 2021

(65) Prior Publication Data

US 2023/0135694 A1    May 4, 2023

(51) Int. Cl.
| | |
|---|---|
| *G06T 11/00* | (2006.01) |
| *G06T 11/40* | (2006.01) |
| *G06T 7/90* | (2017.01) |
| *G06K 9/62* | (2022.01) |
| *G09G 5/02* | (2006.01) |
| *G09G 5/00* | (2006.01) |
| *G06T 7/13* | (2017.01) |
| *G06T 7/70* | (2017.01) |

(52) U.S. Cl.
CPC .............. *G06T 11/001* (2013.01); *G06T 7/13* (2017.01); *G06T 7/70* (2017.01); *G06T 7/90* (2017.01)

(58) Field of Classification Search
CPC . G06T 11/001; G06T 7/90; G06T 7/13; G06T 2207/20081; G06T 2007/20084; G06T 11/40; G06K 9/6274; G06K 9/6257; G06V 10/82; G06V 10/764; G06F 3/04845; G09G 5/02; G09G 5/06; G09G 5/28; G09G 2320/0276; G09G 2320/0271; H04N 1/60; H04N 5/57
See application file for complete search history.

(56) References Cited

U.S. PATENT DOCUMENTS

| | | | |
|---|---|---|---|
| 2004/0164992 A1* | 8/2004 | Gangnet | G06T 11/001 345/591 |
| 2017/0294032 A1* | 10/2017 | Mantuano | G06T 11/40 |
| 2018/0365866 A1* | 12/2018 | Mantuano | G06T 11/001 |
| 2019/0087980 A1* | 3/2019 | Phogat | G06T 11/203 |
| 2020/0175727 A1* | 6/2020 | Phogat | G06K 9/6274 |
| 2020/0273222 A1* | 8/2020 | Sharma | G06T 7/60 |
| 2020/0410724 A1* | 12/2020 | Sharma | G06T 11/001 |

OTHER PUBLICATIONS

Baran, I. et al., "Sketching Clothoid Splines Using Shortest Paths," Computer Graphics Forum, 29(2), 2010, 655-664.

\* cited by examiner

*Primary Examiner* — Wesner Sajous
(74) *Attorney, Agent, or Firm* — NDWE LLP

(57) ABSTRACT

Embodiments are disclosed for reconstructing freeform gradients from an input image. In particular, in one or more embodiments, the disclosed systems and methods comprise receiving an input image, computing an outline of the input image, identifying a set of candidate color handles for the input image, each candidate color handle of the set of candidate color handles representing an extremum point for a color in the input image, generating a reconstructed image using a subset of the set of candidate color handles, determining a reconstruction error by computing a difference between the input image and the reconstructed image, and providing the reconstructed image when the reconstruction error is below a threshold value.

20 Claims, 9 Drawing Sheets
(4 of 9 Drawing Sheet(s) Filed in Color)

RECONSTRUCTING FREEFORM GRADIENTS FROM AN INPUT IMAGE

BACKGROUND

Computing devices (e.g., computers, tablets, smart phones) provide numerous ways for users to capture, create, share, view, and otherwise edit numerous types of digital content, including images. One example is the ability to create freeform color gradients on images or objects by establishing color handles at particular points on an object, applying a color to each of the color handles, and interpolating between the color handles to create a gradient. However, for inexperienced users or artists, it can be difficult and/or time consuming to achieve a desired design goal.

One existing solution can extract linear gradients for images. However, as this solution can only capture linear gradients, any other types of gradients (e.g., freeform gradients, radial gradients) cannot be extracted and reproduced, resulting in inaccurate representations of color gradients.

These and other problems exist with regards to creating color gradients on image objects.

SUMMARY

Introduced here are techniques/technologies that allow a digital design system to reconstruct freeform gradients from an input image. The reconstructed freeform gradient can then be modified and/or applied to another object. To reconstruct freeform gradients from an input image, the digital design system determines an outline of the input image. The digital design system then computes a number of color extrema points as candidate color handles and uses those candidate color handles to generate a reconstructed image with a reconstructed freeform gradient. In one or more embodiments, the digital design system can refine the reconstructed freeform gradient through an iterative process. If the current reconstruction error is more than a defined threshold value, the digital design system modifies the subset of the set of candidate color handles to includes an additional color handle from the set of candidate color handles and then generates the reconstructed image again but using the modified subset of the set of candidate color handles. The digital design system then determines an updated reconstruction error. The digital design system continues the iterative process by adding more points to refine the reconstruction and reduce the error; otherwise, the process stops, and the current reconstructed image is provided as the output.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

One or more embodiments of the present disclosure include a digital design system for reconstructing freeform gradients from an input image that can be modified and/or extracted and applied to another image or object. While there are existing systems that can extract gradients, they have their disadvantages and limitations. For example, in one existing solution, linear gradients can be extracted from an input image. In this solution, salient colors from images are extracted and arranged in the form of linear gradients. However, as this existing solution only extracts linear gradients, if the input image exhibits gradients in any other form (e.g., radial gradients, freeform gradients), the output for the input image will not be representative of the actual spatial arrangement of the colors in the input image. When the linear gradient extracted from the input image having radial or freeform gradients is subsequently applied to an image, the resulting appearance will not match the original input image.

In another existing solution, a design application can vectorize an input image by creating paths with solid fills or strokes. One drawback of this solution is that the design application can create a significant amount of geometry in attempting to represent the different colors and shades present in the input image. The large number of paths produced by the vectorization of the input image can result in challenges to a user seeking to add or modify any colors for the final output image. In addition, while this existing solution can operate where the input image is simple (e.g., the sky), it can breakdown if the input image has a large amount of details (e.g., hair or a tree).

To address these issues, after receiving an input image, the digital design system computes an outline of the input image. The digital design system then identifies a set of candidate color handles for the input image, where each candidate color handle of the set of candidate color handles represents an extremum point for a color in the input image. The digital design system then generates a reconstructed image with a reconstructed gradient using a subset of the set of candidate color handles and determines a reconstruction error by computing a difference between the input image and the reconstructed image. The digital design system then provides the reconstructed image with the reconstructed gradient when the reconstruction error is below a threshold value.

Figure 1:
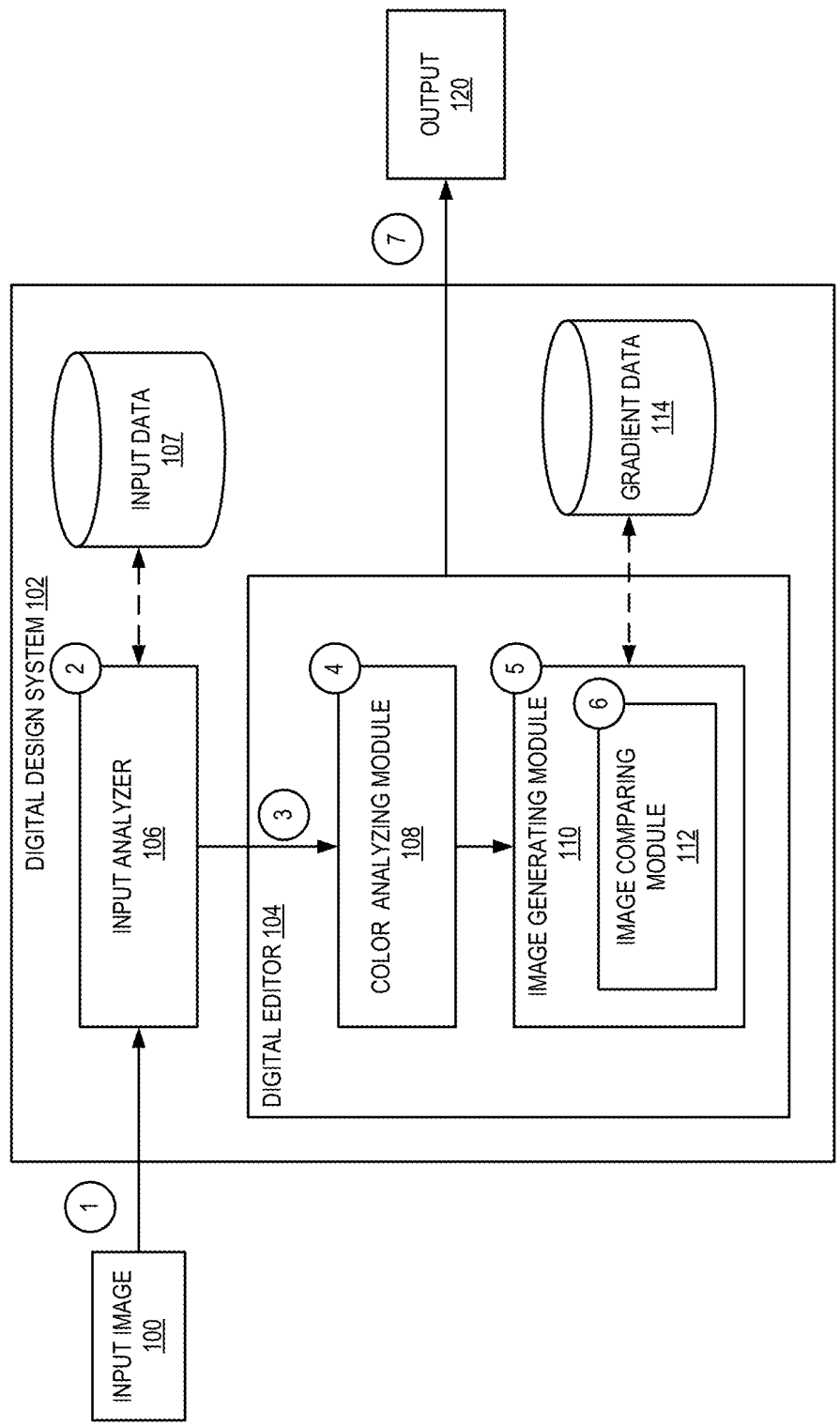
FIG. 1 illustrates a diagram of a process of reconstructing freeform gradients from an input image in accordance with one or more embodiments.

FIG. 1 illustrates a diagram of a process of reconstructing freeform gradients from an input image in accordance with one or more embodiments. As shown in FIG. 1, in one or more embodiments, a digital design system 102 receives an input 100, as shown at numeral 1. In one or more embodiments, the input 100 includes at least an input image, where the input image includes a color gradient. The input 100 can include information specifying an image (e.g., a file name, a file location, etc.) to allow the digital design system 102 to access or retrieve the image from a memory or storage location. In one or more embodiments, the digital design system 102 includes an input analyzer 106 that receives the input 100.

In one or more embodiments, the input analyzer 106 analyzes the input 100, as shown at numeral 2. In one or more embodiments, the input analyzer 106 analyzes the input 100 to identify an input image and, optionally, a mask specifying a region of the image for which the freeform gradient is to be reconstructed. In one or more embodiments, when the input 100 does not include a mask specifying a region of the image, the digital design 102 can, by default, determine that the request is for the entire image.

In one or more embodiments, after the input analyzer 106 analyzes the input image, the input image is sent to the digital editor 104, as shown at numeral 3. In one or more other embodiments, the input analyzer 106 optionally stores the input 100 in a memory or storage location (e.g., input data 107) for later access by the digital editor 104.

Figure 2:
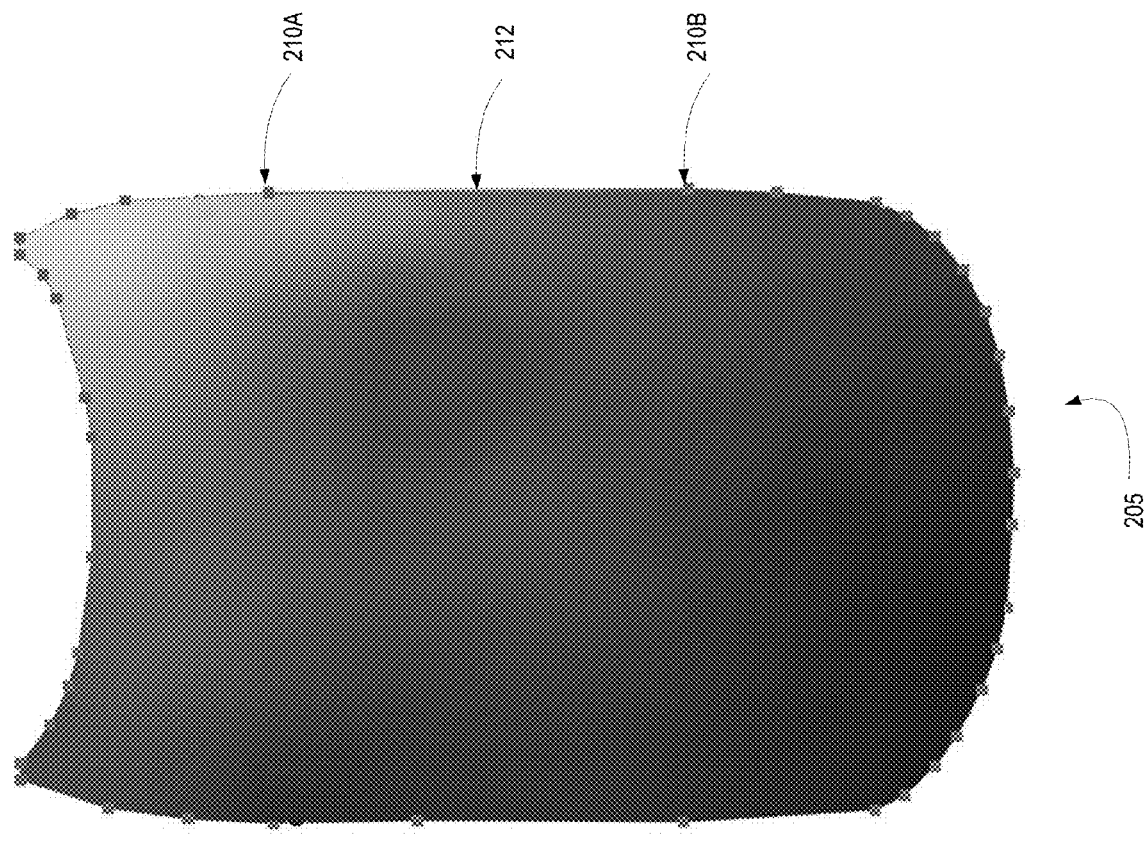
FIG. 2 illustrates an example input image and a corresponding outlined image generated by a digital design system in accordance with one or more embodiments.
Figure 2:
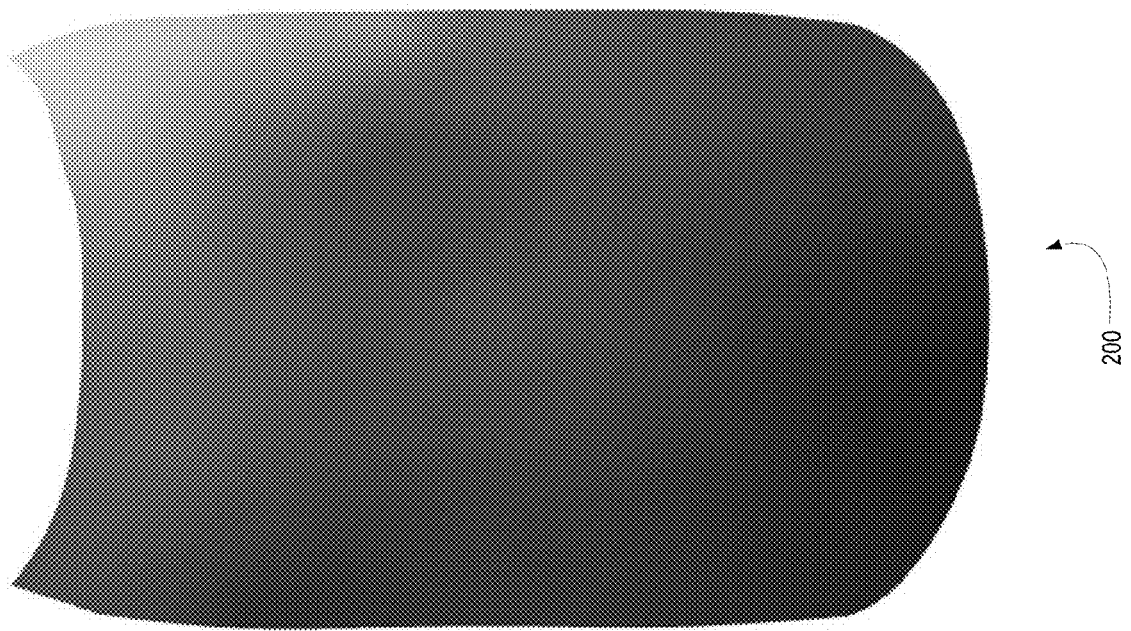

At numeral 4, a color analyzing module 108 identifies a set of candidate color handles for the input image, where each candidate color handle represents an extremum point for a color in the input image. In one or more embodiments, as part of identifying the set of candidate color handles, the color analyzing module 108 generates an outline of the input image. In one or more embodiments, the color analyzing module 108 first uses a non-linear noise reducing smoothing filter, such as a bilateral blur filter, to suppress noise and other high frequency details. To compute the outline of the input image, the color analyzing module 108 converts the input image to a grayscale image using an alpha (a) channel. The color analyzing module 108 then computes an initial outline of the input image from the grayscale image. Each outline can be represented as a pixel chain and the digital design system can use an algorithm (e.g., Ramer-Douglas-Peucker algorithm) to covert the pixel chain to reduce it to a set of connected polylines. In one or more embodiments, the set of connected polylines, and its associated vertices) are used to fit smooth curves using a curve fitting technique. FIG. 2 illustrates an example input image 200 and a corresponding outlined image 205 generated by a digital design system in accordance with one or more embodiments. Examples of pixels in the pixel chain are shown as pixel 210A and pixel 210B, with additional pixels in the pixel chain arranged along the perimeter of the outlined image 205. An example polyline between pixel 210A and pixel 210B is shown as polyline 212. Additional polylines are formed between neighboring pixels in the pixel chain forming the boundary outlining the outlined image 205. As illustrated in FIG. 2, the polylines may include straight line segments and/or curved line segments between the pixels of the pixel chain. In one or more embodiments, the polylines can include vector paths, such as vector lines, Bézier curves, etc.

Returning to FIG. 1, in one or more embodiments, to identify the set of candidate color handles, the color analyzing module 108 uses a function that generates a modified image from the input image by applying a maximum filter to the input image, where the maximum filter dilates the input image. The function then merges adjacent or neighboring local extrema points that are closer than the size of the dilation. The coordinates of locations where the input image is equal to the modified image are returned as the extrema points (e.g., the set of candidate color handles for the input image).

In one or more embodiments, an image generating module 110 generates a reconstructed image using the set of candidate color handles generated by the color analyzing module 108, as shown at numeral 5. In one or more embodiments, the image generating module 110 uses a subset of the set of candidate color handles. Using the subset of the set of candidate color handles and the outline created by the color analyzing module 108, the image generating module 110 computes a rasterization of freeform gradients as an initial reconstructed image. In one or more embodiments, the image generating module 110 determines a color for each pixel of a plurality of pixels in the reconstructed image by interpolating between colors at the subset of the set of candidate color handles and the outline of the input image.

Figure 3:
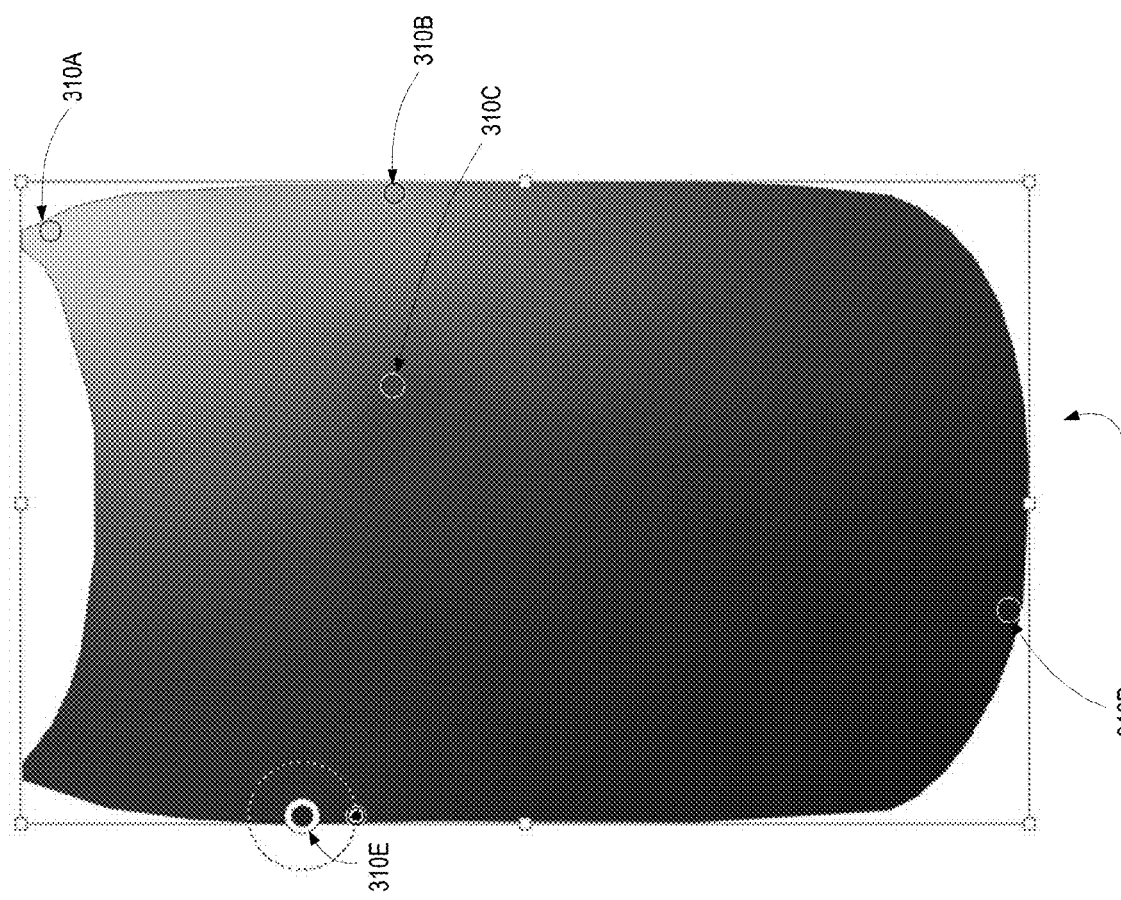
FIG. 3 illustrates an example reconstructed image 305 using an initial set of candidate color handles generated by a digital design system in accordance with one or more embodiments
Figure 3:
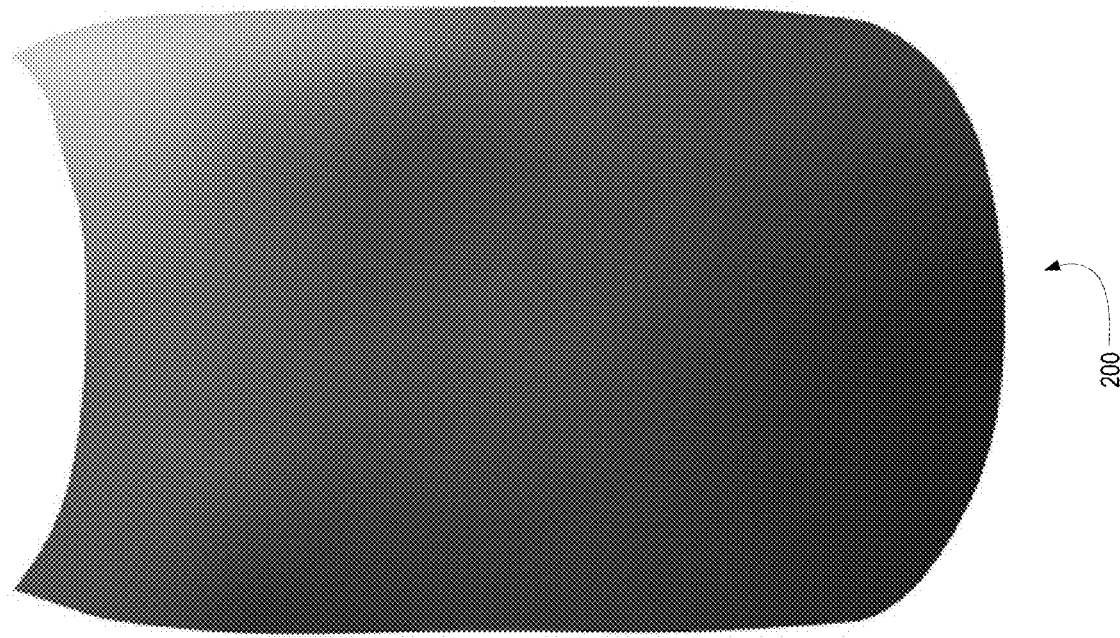

FIG. 3 illustrates an example reconstructed image 305 using an initial set of candidate color handles generated by a digital design system in accordance with one or more embodiments. As illustrated in FIG. 3, the reconstructed image 305 includes a reconstructed freeform gradient generated using an initial subset of the set of candidate color handles, indicated as color handles 310A-E.

Returning to FIG. 1, in one or more embodiments, an image comparing module 112 determines a reconstruction error by computing a difference between the input image and the reconstructed image, as shown at numeral 6. In one or more embodiments, the image comparing module 112 applies a large-kernel blur (iteratively reducing size with each iteration) to the input image and the reconstructed image. The image comparing module 112 then computes the difference between the input image and the reconstructed image to determine the regions with a high magnitude of reconstruction error.

Figure 4:
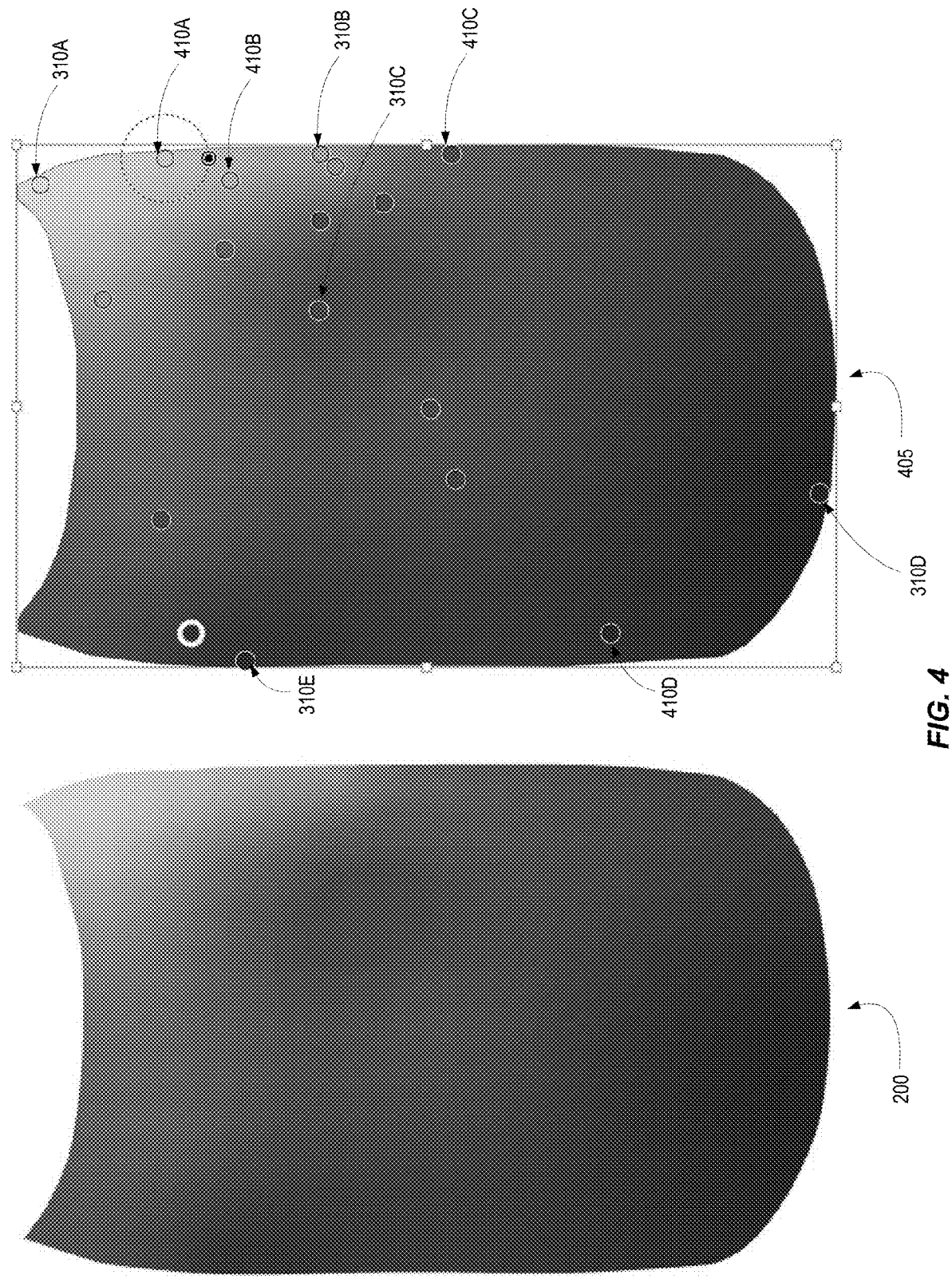
FIG. 4 illustrates an example updated reconstructed image using an updated set of candidate color handles generated by a digital design system in accordance with one or more embodiments.

FIG. 4 illustrates an example updated reconstructed image 405 using an updated set of candidate color handles generated by a digital design system in accordance with one or more embodiments. As illustrated in FIG. 4, the updated reconstructed image 405 includes an updated reconstructed freeform gradient generated using the initial subset of the set of candidate color handles, indicated as color handles 310A-E, and additional color handles of the set of candidate color handles (e.g., color handles 410A-D).

Returning to FIG. 1, when the reconstruction error is below the threshold value, the process proceeds to numeral 7. When the reconstruction error is above a threshold value, the image generating module 110 iteratively adds an additional color handle to the subset and generates a new reconstructed image until the reconstruction error is below the threshold value.

Figure 5:
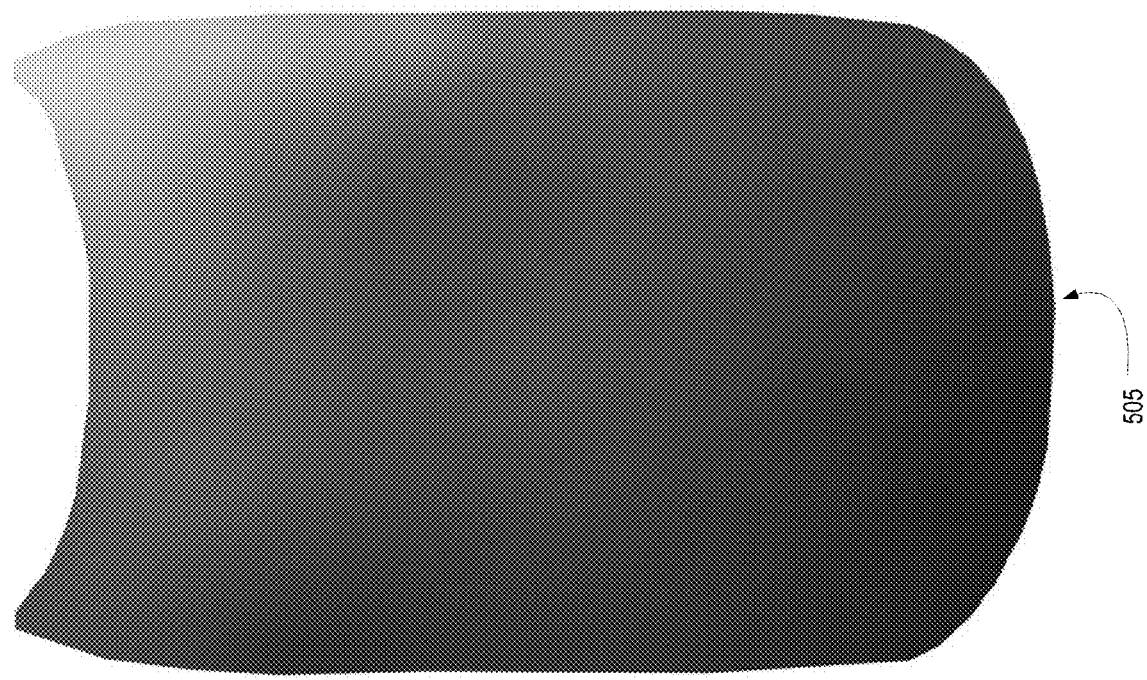
FIG. 5 illustrates an example output reconstructed image generated by a digital design system in accordance with one or more embodiments.
Figure 5:
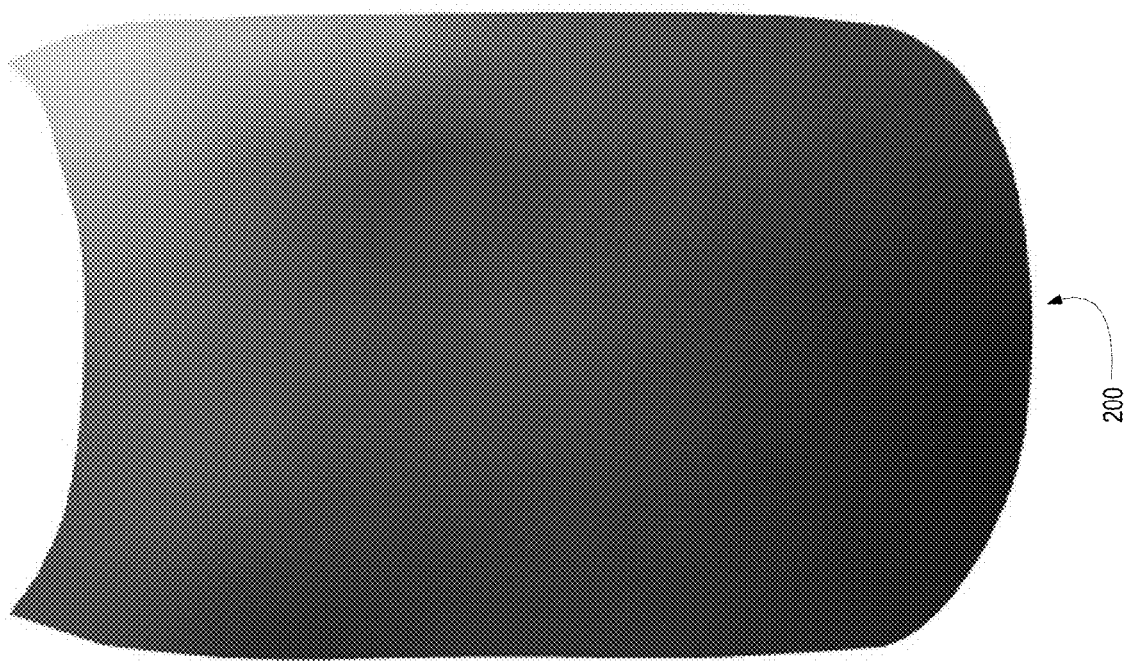

At numeral 7, the digital design system 102 returns an output 120 including the reconstructed image with the reconstructed freeform gradient. In one or more embodiments, after the process described above in numerals 1-6, the output 120 is sent to the user or computing device that provided the input 100 to the digital design system 102. For example, after the process described above in numerals 1-7, the reconstructed image with the reconstructed freeform gradient can be displayed in the user interface. FIG. 5 illustrates an example output reconstructed image generated by a digital design system in accordance with one or more embodiments. As illustrated in FIG. 5, the output reconstructed image 505 has a reconstructed freeform gradient similar to the freeform gradient of the input image 200. In one or more embodiments, once the output reconstructed image 505 is provided, a user can manipulate the freeform gradient (e.g., by removing, adding, and/or moving color handles) and/or select a portion or all of the freeform gradient and apply the selection to another image or shape. In one or more embodiments, the reconstructed freeform gradient, including the subset of the set of candidate color handles used to generate the reconstructed gradient, can be stored in a memory or storage location (e.g., gradient data 114) for later access and application to an image object or shape.

Figure 6:
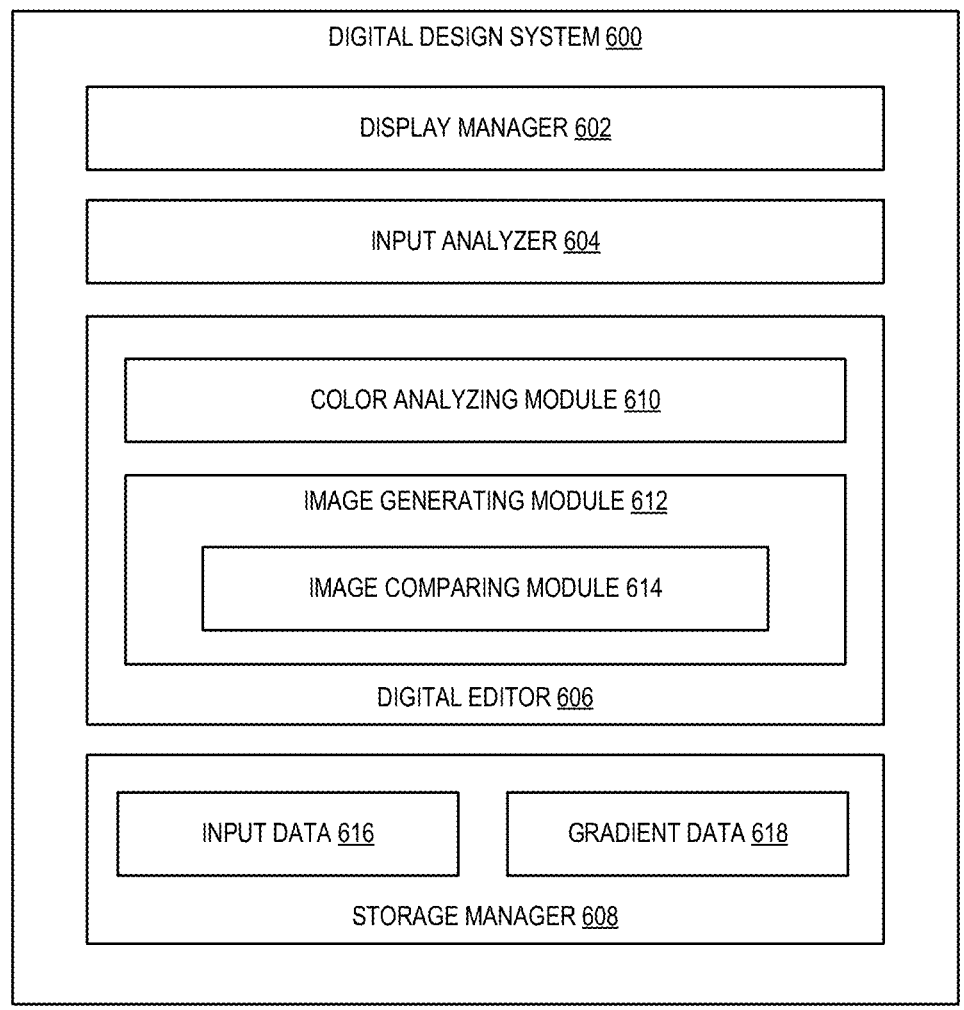
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a display manager 602, an input analyzer 604, a digital editor 606, and a storage manager 608. As shown, the digital editor 606 includes a color analyzing module 610, and an image generating module 612. The image generating module 612 can also include an image comparing module 614. The storage manager 608 includes input data 616 and the gradient data 618.

As illustrated in FIG. 6, the digital design system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the digital design system 600 also includes an input analyzer 604. The input analyzer 604 analyzes an input received by the digital design system 600 to identify an input image, and if provided in the input, a portion of the input image selected for freeform gradient reconstruction.

As further illustrated in FIG. 6, the digital design system 600 also includes a digital editor 606. In one or more embodiments, the digital editor 606 includes a color analyzing module 610 configured to generate an outline of the input image and determine a set of candidate color handles. For example, the color analyzing module 610 can be configured to identify a set of candidate color handles for the input image, where each candidate color handle of the set of candidate color handles represents an extremum point for a color in the input image.

As further illustrated in FIG. 6, the digital editor 606 includes an image generating module 612 configured to utilize the set of candidate color handles and the outline generated by the color analyzing module 610 to generate a reconstructed image with a reconstructed freeform gradient based on the freeform gradient of the input image. In one or more embodiments, the image generating module 612 generates the reconstructed image with the reconstructed freeform gradient using a subset of the set of candidate color handles. After generating the reconstructed image, an image comparing module 112 determines a reconstruction error between the input image and the reconstructed image. When the reconstruction error is above a threshold value, the image generating module 612 adds at least one candidate color handle to the subset of the set of candidate color handles and generates an updated reconstructed image with an updated reconstructed freeform gradient. The image generating module 612 can iteratively generate updated reconstructed images by adding additional candidate color handles until the reconstruction error is at or below the threshold value.

As further illustrated in FIG. 6, the storage manager 608 includes input data 616 and gradient data 618. In particular, the input data 616 may include input data received by the digital design system 600 indicating an input image and, optionally, a portion of the input image selected for freeform gradient reconstruction. The gradient data 618 may include the results of the freeform gradient reconstruction process, including the reconstructed image with the reconstructed freeform gradient and the subset of the set of candidate color handles used to the generate the reconstructed image.

Each of the components 602-608 of the digital design system 600 and their corresponding elements (as shown in FIG. 6) may be in communication with one another using any suitable communication technologies. It will be recognized that although components 602-608 and their corresponding elements are shown to be separate in FIG. 6, any of components 602-608 and their corresponding elements may be combined into fewer components, such as into a single facility or module, divided into more components, or configured into different components as may serve a particular embodiment.

The components 602-608 and their corresponding elements can comprise software, hardware, or both. For example, the components 602-608 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-608 and their corresponding elements can comprise hardware, such as a special purpose processing device to perform a certain function or group of functions. Additionally, the components 602-608 and their corresponding elements can comprise a combination of computer-executable instructions and hardware.

Furthermore, the components 602-608 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-608 of the digital design system 600 may be implemented as a stand-alone application, such as a desktop or mobile application. Furthermore, the components 602-608 of the digital design system 600 may be implemented as one or more web-based applications hosted on a remote server. Alternatively, or additionally, the components of the digital design system 600 may be implemented in a suit of mobile device applications or "apps." To illustrate, the components of the digital design system 600 may be implemented in a document processing application or an image processing application, including but not limited to ADOBE® PHOTOSHOP®, ADOBE® ILLUSTRATOR, ADOBE® PREMIERE® PRO, etc., or a cloud-based suite of applications such as CREATIVE CLOUD®. "ADOBE®," "PHOTOSHOP®," "ADOBE PREMIERE®," and "CREATIVE CLOUD®" are either a registered trademark or trademark of Adobe Inc. in the United States and/or other countries.

Figure 7:
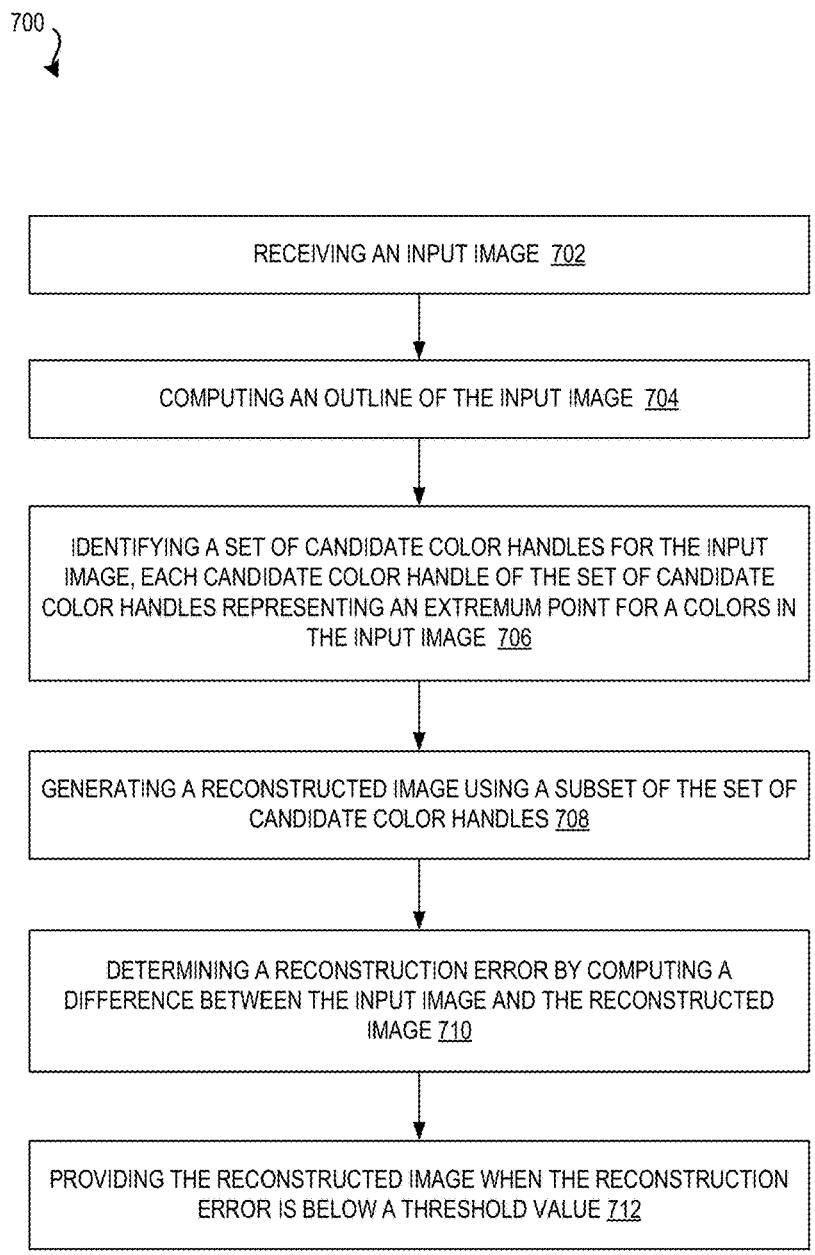
FIG. 7 illustrates a flowchart of a series of acts in a method of reconstructing freeform gradients from an input image in accordance with one or more embodiments.

FIGS. 1-6, the corresponding text, and the examples, provide a number of different systems and devices that allow a digital design system to reconstruct freeform gradients from an input image. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of reconstructing freeform gradients from an input image in accordance with one or more embodiments. In one or more embodiments, the method 700 is performed in a digital medium environment that includes the digital design system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving an input image. In one or more embodiments, the digital design system receives the input image from a user (e.g., via a computing device) or from a memory or storage location. In one or more embodiments, the user may select a document in an application, or the user may submit the document to a web service or an application configured to receive inputs. In one or more embodiments, the input image also includes a mask specifying a region of the input image for which the gradient is to be recreated. In other embodiments, the digital design system can automatically segment the entire input image and then analyze and reconstruct the gradient of either the entire input image or relevant regions of the input image.

As shown in FIG. 7, the method 700 also includes an act 704 of computing an outline of the input image. In one or more embodiments, the digital design system first uses a non-linear noise reducing smoothing filter, such as a bilateral blur filter, to suppress noise and other high frequency details. To compute the outline of the input image, the digital design system converts the input image to a grayscale image using an alpha (α) channel. The digital design system then computes an initial outline of the input image from the grayscale image. Each outline can be represented as a pixel chain and the digital design system can use an algorithm (e.g., Ramer-Douglas-Peucker algorithm) to covert the pixel chain to reduce it to a set of connected polylines. In one or more embodiments, the set of connected polylines, and its associated vertices) are used to fit smooth curves using a curve fitting technique.

As shown in FIG. 7, the method 700 also includes an act 706 of identifying a set of candidate color handles for the input image. Each candidate color handle of the set of color handles represents an extremum point for a color in the input image. The number of set of the set of candidate color handles for the input image can be user-defined.

In one or more embodiments, the digital design system uses a function that saturates the input image and finds local extrema points using morphological operations, including dilation and merging. For example, one function generates a modified image from the input image by applying a maximum filter to the input image, where the maximum filter dilates the input image. The function then merges adjacent or neighboring local extrema points that are closer than the size of the dilation. The coordinates of locations where the input image is equal to the dilated image are returned as the extrema points (e.g., the set of color handles for the input image).

The digital design system can also find color iso-contours that are located around local extrema points using a ridge detection method, such as Ridge Operators, and accept only strong ridges. The digital design system then fits a Bezier spline to the approximated ridge with a small number of Bezier segments. For each such curve, the digital design system adds a corresponding extrema point at the center of the curve as a candidate color handle.

As shown in FIG. 7, the method 700 also includes an act 708 of generating a reconstructed image using a subset of the set of candidate color handles. In one or more embodiments, the digital design system selects half of the set of candidate color handles as the subset. Using the subset of the set of candidate color handles and the outline created previously, the digital design system computes a rasterization of freeform gradients as an initial reconstructed image. In one or more embodiments, the digital design system determines a color for each pixel of a plurality of pixels in the reconstructed image by interpolating between colors at the subset of the set of candidate color handles and the outline of the input image.

As shown in FIG. 7, the method 700 also includes an act 710 of determining a reconstruction error by computing a difference between the input image and the reconstructed image. In one or more embodiments, the digital design system applies a large-kernel blur (iteratively reducing size with each iteration) to the input image and the reconstructed image. The digital design system then computes the difference between the input image and the reconstructed image to determine the regions with a high magnitude of reconstruction error.

When the reconstruction error is above a threshold value, the digital design system modifies the subset of the set of candidate color handles to includes an additional color handle from the set of candidate color handles. In one or more embodiments, the digital design system adds the additional color handle at the highest-error region that is not too close to an existing color handle, where the color of the additional color handle is the color of a slightly blurred version of the target image. The digital design system then generates an updated reconstructed image using the modified subset of color handles and determines an updated reconstruction error. The digital design system iteratively adds additional color handles and determines updated reconstruction errors until the updated reconstruction error is at or below the threshold value.

As shown in FIG. 7, the method 700 also includes an act 712 of providing the reconstructed image when the reconstruction error is at or below a threshold value. For example, the reconstructed image can be rendered on a display of a user computing device, stored in a memory or storage location, etc.

In one or more embodiments, the digital design system can subsequently receive inputs selecting the reconstructed gradient, or a portion of the reconstructed gradient, from the reconstructed image. The reconstructed gradient can then be extracted from the reconstructed image and applied to a new or different image. For example, the reconstructed freeform gradient can be saved as a graphic style and then applied to any arbitrary geometry. In one or more embodiments, the reconstructed gradient, including the subset of the set of candidate color handles used to generate the reconstructed gradient, is stored in a memory or storage location for later access and application to an image object or shape.

In one or more embodiments, the reconstructed freeform gradient can also be modified. For example, based on user inputs, the positions of one or more of the plurality of color handles used to reconstruct the freeform gradient can be modified (e.g., moved from a starting location to another location), one or more the plurality of color handles can be removed, additional color handles can be added, etc.

Figure 8:
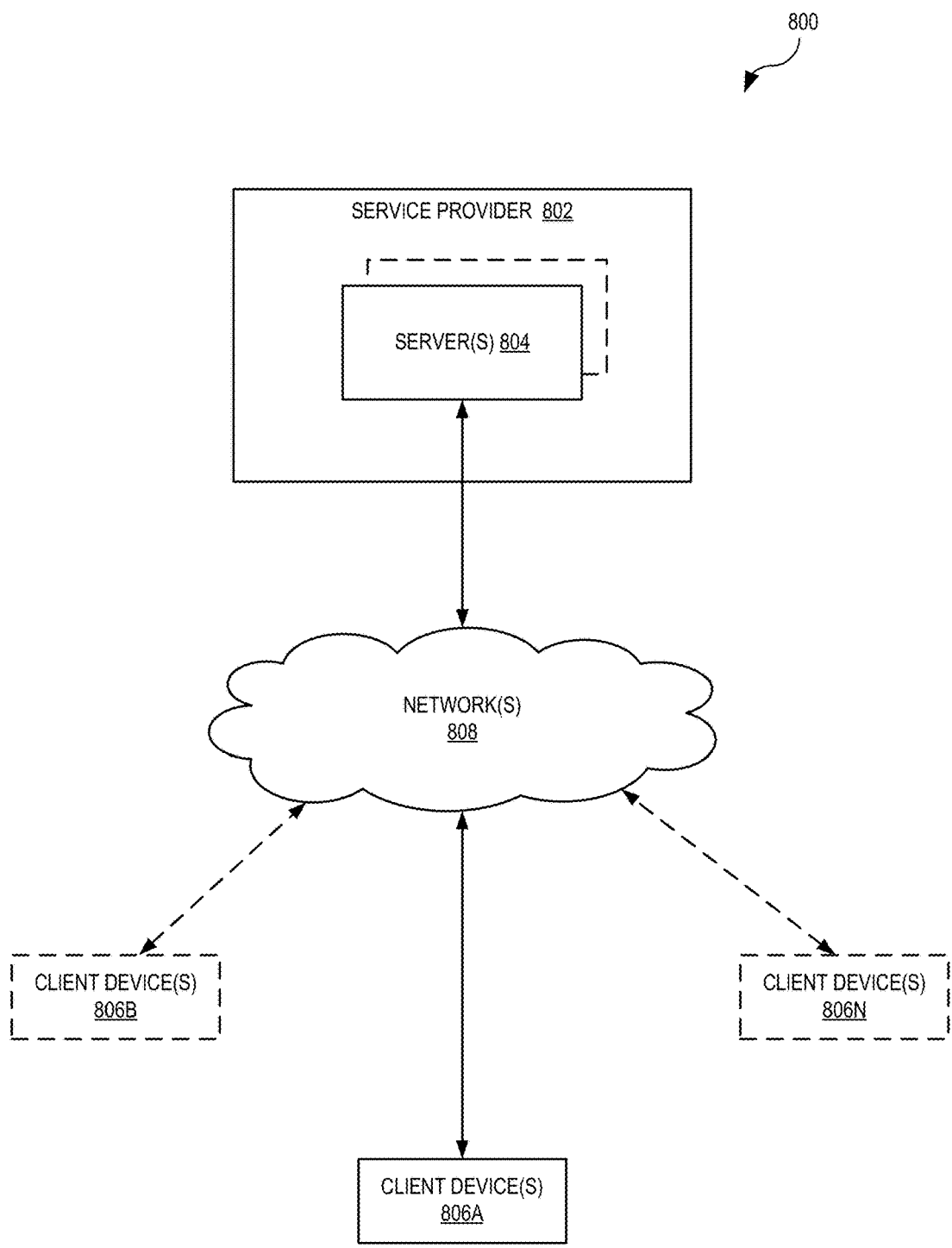
FIG. 8 illustrates a schematic diagram of an exemplary environment in which the digital design system can operate in accordance with one or more embodiments.

FIG. 8 illustrates a schematic diagram of an exemplary environment 800 in which the digital design system can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the digital design system. In particular, the digital design system may be implemented in whole or in part on the client device 806A. Alternatively, in some embodiments, the environment 800 is implemented in a distributed architecture across multiple computing devices.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access the service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including input data or other information. For example, a server 804 may receive data from a client device, such as the client device 806A, and send the data to another client device, such as the client device 806B and/or 806N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the digital design system. In particular, the digital design system can comprise an application running on the one or more servers 804 or a portion of the digital design system can be downloaded from the one or more servers 804. For example, the digital design system can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide inputs, including an input image. Upon receiving the input image, the one or more servers 804 can automatically perform the methods and processes described above to reconstruct freeform gradients from an input image.

As just described, the digital design system may be implemented in whole, or in part, by the individual elements 802-808 of the environment 800. It will be appreciated that although certain components of the digital design system are described in the previous examples with regard to particular elements of the environment 800, various alternative implementations are possible. For instance, in one or more embodiments, the digital design system is implemented on any of the client devices 806A-806N. Similarly, in one or more embodiments, the digital design system may be implemented on the one or more servers 804. Moreover, different components and functions of the digital design system may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
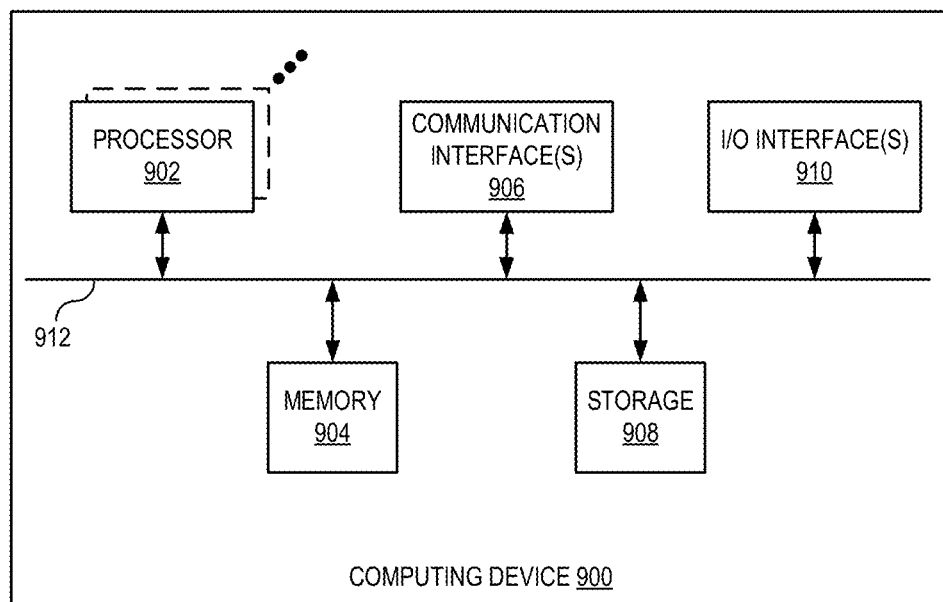
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the digital design system. As shown by FIG. 9, the computing device can comprise a processor 902, memory 904, one or more communication interfaces 906, a storage device 908, and one or more input or output ("I/O") devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more I/O devices/interfaces 910, which are provided to allow a user to provide input to, receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving an input image;
   computing an outline of the input image;
   identifying a set of candidate color handles for the input image, each candidate color handle of the set of candidate color handles representing an extremum point for a color in the input image;
   generating a reconstructed image using a subset of the set of candidate color handles;
   determining a reconstruction error by computing a difference between the input image and the reconstructed image; and
   providing the reconstructed image when the reconstruction error is below a threshold value.

2. The computer-implemented method of claim 1, wherein generating the reconstructed image using the set of candidate color handles comprises:
   determining a color for each pixel of a plurality of pixels in the reconstructed image by interpolating between colors at the subset of the set of candidate color handles and the outline of the input image.

3. The computer-implemented method of claim 1, further comprising:
   determining the reconstruction error is above the threshold value;
   modifying the subset of the set of candidate color handles to includes an additional color handle from the set of candidate color handles;
   generating the reconstructed image using the modified subset of the set of candidate color handles; and
   determining an updated reconstruction error.

4. The computer-implemented method of claim 3, further comprising:
   iteratively determining updated reconstruction errors until an updated reconstruction error is below the threshold value.

5. The computer-implemented method of claim 1, wherein computing the outline of the input image comprises:
   converting the input image to a converted input image using an alpha channel;
   generating a pixel chain representing the outline of the converted input image;
   converting the pixel chain to a set of connected polylines; and
   applying smooth curve fitting to the set of connected polylines.

6. The computer-implemented method of claim 1, wherein a number of the set of candidate color handles for the input image is user-defined.

7. The computer-implemented method of claim 1, further comprising:
   selecting half of the set of candidate color handles as the subset of the set of candidate color handles.

8. The computer-implemented method of claim 3, further comprising:
   determining a region of the reconstructed image with a highest reconstruction error; and
   selecting the additional color handle from the set of candidate color handles closest to the region of the reconstructed image with a highest magnitude of reconstruction error.

9. The computer-implemented method of claim 1, further comprising:
   extracting a reconstructed gradient from the reconstructed image; and
   applying the reconstructed gradient to a different image.

10. A non-transitory computer-readable storage medium including instructions stored thereon which, when executed by at least one processor, cause the at least one processor to:
    receive an input image;
    compute an outline of the input image;
    identify a set of candidate color handles for the input image, each candidate color handle of the set of candidate color handles representing an extremum point for a color in the input image;
    generate a reconstructed image using a subset of the set of candidate color handles;
    determine a reconstruction error by computing a difference between the input image and the reconstructed image; and
    provide the reconstructed image when the reconstruction error is below a threshold value.

11. The non-transitory computer-readable storage medium of claim 10, wherein to generate the reconstructed image using the set of candidate color handles, the instructions, when executed, further cause the at least one processor to:
    determine a color for each pixel of a plurality of pixels in the reconstructed image by interpolating between colors at the subset of the set of candidate color handles and the outline of the input image.

12. The non-transitory computer-readable storage medium of claim 10, wherein the instructions, when executed, further cause the at least one processor to:
    determine the reconstruction error is above the threshold value;
    modify the subset of the set of candidate color handles to includes an additional color handle from the set of candidate color handles;
    generate the reconstructed image using the modified subset of the set of candidate color handles; and
    determine an updated reconstruction error.

13. The non-transitory computer-readable storage medium of claim 12, wherein the instructions, when executed, further cause the at least one processor to:
    iteratively determine updated reconstruction errors until an updated reconstruction error is below the threshold value.

14. The non-transitory computer-readable storage medium of claim 10, wherein to compute the outline of the input image, the instructions, when executed, further cause the at least one processor to:
    convert the input image to a converted input image using an alpha channel;
    generate a pixel chain representing the outline of the converted input image;
    convert the pixel chain to a set of connected polylines; and
    apply smooth curve fitting to the set of connected polylines.

15. The computer-implemented method of claim 9, further comprising:
    modifying the reconstructed gradient by moving a location of one or more of the subset of the set of candidate color handles.

16. A system, comprising:
    a computing device including a memory and at least one processor, the computing device implementing a digital design system,
    wherein the memory includes instructions stored thereon which, when executed, cause the digital design system to:
    receive an input image;
    compute an outline of the input image;
    identify a set of candidate color handles for the input image, each candidate color handle of the set of candidate color handles representing an extremum point for a color in the input image;
    generate a reconstructed image using a subset of the set of candidate color handles;
    determine a reconstruction error by computing a difference between the input image and the reconstructed image; and
    provide the reconstructed image when the reconstruction error is below a threshold value.

17. The system of claim 16, wherein the instructions to generate the reconstructed image using the set of candidate color handles, further causes the digital design system to:
    determine a color for each pixel of a plurality of pixels in the reconstructed image by interpolating between colors at the subset of the set of candidate color handles and the outline of the input image.

18. The system of claim 16, wherein the instructions, when executed, further cause the digital design system to:
- determine the reconstruction error is above the threshold value;
- modify the subset of the set of candidate color handles to includes an additional color handle from the set of candidate color handles;
- generate the reconstructed image using the modified subset of the set of candidate color handles; and
- determine an updated reconstruction error.

19. The system of claim 18, wherein the instructions, when executed, further cause the digital design system to:
- iteratively determine updated reconstruction errors until an updated reconstruction error is below the threshold value.

20. The system of claim 16, wherein the instructions to compute the outline of the input image, when executed, further cause the at least one processor to:
- convert the input image to a converted input image using an alpha channel;
- generate a pixel chain representing the outline of the converted input image;
- convert the pixel chain to a set of connected polylines; and
- apply smooth curve fitting to the set of connected polylines.

* * * * *